United States Patent [19]

Palma et al.

[11] Patent Number: 4,549,299
[45] Date of Patent: Oct. 22, 1985

[54] REVERSE WAVE RING RESONATOR CONTROL SYSTEM

[75] Inventors: Gary E. Palma, Bloomfield; Albert W. Angelbeck, Glastonbury, both of Conn.

[73] Assignee: United Technologies Corporation, Hartford, Conn.

[21] Appl. No.: 475,276

[22] Filed: Mar. 14, 1983

[51] Int. Cl.[4] ............................................. H01S 3/00
[52] U.S. Cl. ............................................................. 372/18
[58] Field of Search .................................... 372/18, 19

[56] References Cited

U.S. PATENT DOCUMENTS

| | | | |
|---|---|---|---|
| 3,646,468 | 2/1972 | Buczek et al. | 372/18 |
| 3,646,469 | 2/1972 | Buczek et al. | 372/18 |
| 4,025,875 | 5/1977 | Fletcher et al. | 372/18 |
| 4,264,870 | 4/1981 | Avicola et al. | 372/18 |
| 4,320,359 | 3/1982 | Peterson et al. | 372/18 |
| 4,393,503 | 7/1983 | Angelbeck et al. | 372/18 |

Primary Examiner—William L. Sikes
Assistant Examiner—Robert E. Wise
Attorney, Agent, or Firm—Eric W. Petraske

[57] ABSTRACT

A master oscillator regenerative power amplifier system is maintained in a locked state by variation of the power amplifier cavity length to minimize reverse wave radiation.

2 Claims, 1 Drawing Figure

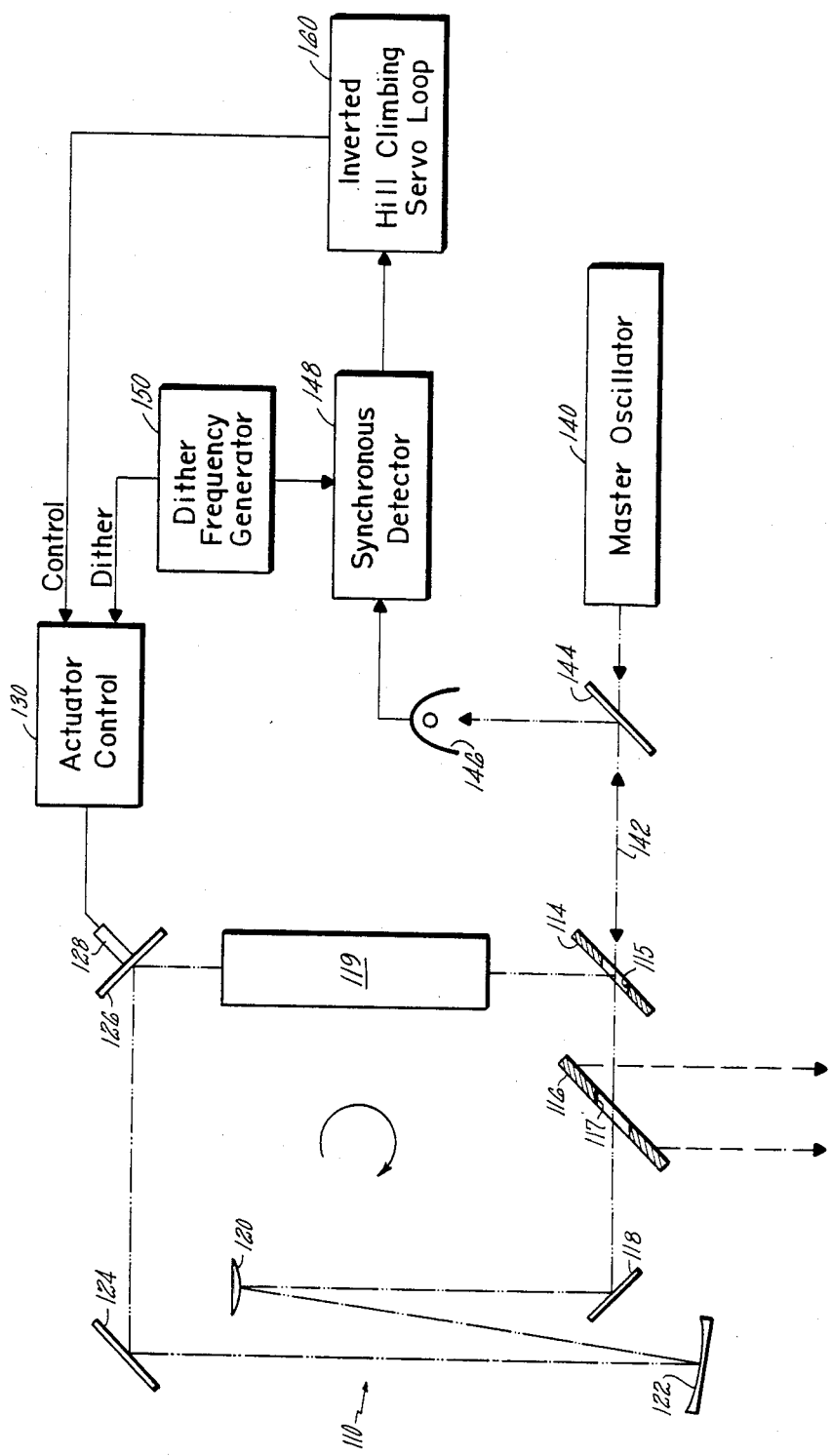

REVERSE WAVE RING RESONATOR CONTROL SYSTEM

The Government has rights in this invention pursuant to Contract No. N00173-79-C-0410 awarded by the Department of the Navy.

DESCRIPTION

1. Technical Field

The field of the invention is that of controlling a regenerative ring amplifier in a master oscillator power amplifier system to tune the cavity length of the power amplifier so that it is locked to the master oscillator.

2. Background Art

In the art of high power lasers, especially chemical lasers operating in the megawatt power range, there has long been a serious problem in tuning a regenerative power amplifier to maintain the optimum configuration. Typically, these amplifiers are locked to a master oscillator in order to produce the highest quality output beam, but the master oscillator is such a small fraction of the output power that the output power of the power amplifier does not vary substantially whether the amplifier is locked or not locked to the oscillator.

U.S. Pat. No. 4,295,741 illustrates an interferometric method of controlling the high power amplifier to lock to a master oscillator. This method generates a synthetic wavelength in order to provide an accurate discriminant.

U.S. Pat. Nos. 3,537,027 and 3,644,841 show a method of frequency control of a single mode ring laser having two overlapping ring resonators by tuning one ring of the two ring system to maintain equal amounts of power in the forward and reverse directions. This system uses a low power stable ring resonator.

DISCLOSURE OF INVENTION

The invention relates to control of a master oscillator power amplifier chemical laser system in which the power amplifier cavity length is tuned to provide injection locking by the master oscillator using the reverse wave power as a discriminant and minimizing the reverse wave power.

BRIEF DESCRIPTION OF DRAWING

The single FIGURE of the drawing illustrates an embodiment of the invention.

BEST MODE FOR CARRYING OUT THE INVENTION

In the FIGURE, regenerative power amplifier indicated generally as 110 has an unstable ring resonator comprising curved mirrors 122 and 120 which provide the beam magnification, turning mirrors 118 and 124, movable mirror 126 controlled by actuator 128, gain medium 119, injection mirror 114 having injection aperture 115, and output coupling mirror 116 having aperture 117. The forward wave circulates about the ring in the direction indicated by the arrow. A control beam is injected along beam line 142 through aperture 115 and traverses the resonator, expanding on each pass of the ring until it is coupled out by outcoupling mirror 116. It is intended that the high quality relatively low power beam generated by master oscillator 140 will control the beam within ring resonator 110 in order to provide the highest quality output beam.

In any real-world ring resonator, there will be coupling between the forward and reverse wave modes. The art has always attempted to suppress the reverse wave power because it represents a waste of power that is not used for output and because, traveling in the reverse direction, it may get back into the relatively delicate components of the master oscillator and damage the master oscillator. Different schemes have been used in the prior art to suppress the reverse wave, but none of them has been completely effective.

In this example, reverse wave radiation travels backwards through aperture 115 along the direction of the injected beam 142, strikes beam splitter 144 and is deflected to sensor detector 146. Synchronous detector 148 which is controlled by dither frequency generator 150 to respond to the amplitude modulation of the reverse wave power at the dithering frequency, detects the reverse wave power and passes a signal on to inverted hill climbing servo loop 160. The servo loop responds to the reverse wave power and generates a signal which passes to actuator control 130 together with the dither signal from generator 150. The control signal from loop 160 controls the average position of mirror 126 and the dither frequency is used to dither the mirror about that position, as is conventional in the art. Servo loop 160 is a conventional hill climbing servo loop modified only in that it seeks a minimum in the discriminant instead of the maximum. This modification may be readily done by those skilled in the art by a number of means such as taking the ratio of a fixed quantity and the discriminant and maximizing that ratio. When the discriminant is a minimum, the ratio will be a maximum.

In the field of low power regenerative amplifiers, it is not difficult to tell when the power amplifier is injection locked because the master oscillator is typically a sizable fraction in power of the output amplifier. In the field of chemical lasers, however, it is not practical to build a high power master oscillator and the power ratio is very adverse, situations in which the injected power is less than 10% of the output power being quite common. In this regime, it is very difficult to tell by looking at the output power, whether the power amplifier is or is not injection locked. The relative power change between the locked and the unlocked configuration depends on both the ratio of master oscillator power to output power and on the amount by which the output power amplifier is driven past saturation. For a typical example in which the injected power is 3% of the forward wave power and the output power is three times the saturation power, the power increase in locking is only a few percent and it is very difficult to make a measurement with such precision.

An advantageous feature of this invention is that it used the hitherto undesired reverse wave power, which the prior art attempted to eliminate, as a discriminant, thereby turning a drawback into an advantage. It has been found that for the same 3% ratio of injected to forward wave power and a typical reverse wave power of 10% of the forward power, the percent change in reverse wave power when locking is achieved is approximately 50%, a readily observable change.

The prior art patents 3,537,027 and 3,644,841 deal with a method of getting a stable frequency laser in which power considerations are not important. These systems use two overlapping stable ring resonators and tune for equal amounts of power in both the forward and reverse waves. High energy lasers always use unstable ring resonators, of course, and, in the megawatt power range, equal amounts of reverse power are simply unthinkable. Those skilled in the art would not attempt to maintain equal amounts of power in the forward and reverse directions. Further, since chemical lasers are inherently multifrequency devices, the concept of maintaining a stable frequency does not have much relevance.

In the drawing, the reverse wave radiation that has traveled out along the master oscillator beam line is used, but the reverse wave could be sampled off scraper mirror 116 or at any other convenient point.

The disclosed embodiment is that of a chemical laser, but the invention could be applied to other high power systems, such as a $CO_2$ laser, as well.

We claim:

1. A system for controlling a regenerative power amplifier having an unstable ring resonator with a variable resonator cavity length, which resonates radiation in forward and reverse directions to lock the power amplifier to a master oscillator comprising:

deflecting means for deflecting a portion of said radiation resonated in said reverse direction out of said unstable resonator;

an optical detector, positioned to intercept said deflected reverse radiation, for providing a detector signal representative of the power of said deflected reverse radiation;

means for passing said detector signal to a servo loop control;

a servo loop control, connected to said means for passing said detector signal, for receiving said detector signal and forming therefrom a control signal for controlling said variable resonator cavity length to minimize said detector signal; and control means for receiving said control signal and varying said variable length in response thereto.

2. A system according to claim 1, in which said deflecting means is a beam splitter for passing a master oscillator beam in a first direction along a master oscillator beam line from said master oscillator toward said unstable ring resonator and simultaneously deflecting reverse radiation traveling along said master oscillator beam line opposite to said first direction; and in which said control means also receives a dither signal for dithering said variable path length with a dither frequency about a mean length determined by said control signal and said means for passing said detector signal include synchronous detector means for passing that portion of said detector signal at said dither frequency to said servo loop control.

* * * * *